United States Patent
Watanabe et al.

(10) Patent No.: US 9,672,812 B1
(45) Date of Patent: *Jun. 6, 2017

(54) QUALIFYING TRIGGER EXPRESSIONS IN SPEECH-BASED SYSTEMS

(71) Applicant: Amazon Technologies, Inc., Seattle, WA (US)

(72) Inventors: Yuzo Watanabe, Seattle, WA (US); Paul Joseph Schaffert, Palo Alto, CA (US); Bjorn Hoffmeister, Seattle, WA (US); Stan Weidner Salvador, Tega Cay, SC (US)

(73) Assignee: Amazon Technologies, Inc., Seattle, WA (US)

( * ) Notice: Subject to any disclaimer, the term of this patent is extended or adjusted under 35 U.S.C. 154(b) by 467 days.

This patent is subject to a terminal disclaimer.

(21) Appl. No.: 14/030,917

(22) Filed: Sep. 18, 2013

(51) Int. Cl.
    *G10L 15/00* (2013.01)
    *G10L 15/04* (2013.01)

(52) U.S. Cl.
    CPC .................................. *G10L 15/04* (2013.01)

(58) Field of Classification Search
    USPC ................................ 704/246, 247, 251, 252
    See application file for complete search history.

(56) References Cited

U.S. PATENT DOCUMENTS

| | | | |
|---|---|---|---|
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 8,645,132 B2 * | 2/2014 | Mozer | G10L 15/063 704/233 |
| 2012/0223885 A1 | 9/2012 | Perez | |
| 2013/0054235 A1 * | 2/2013 | Mozer | G10L 15/063 704/233 |
| 2013/0072080 A1 * | 3/2013 | Garbos | A63H 33/26 446/26 |
| 2015/0006176 A1 * | 1/2015 | Pogue | G10L 15/22 704/249 |
| 2015/0059086 A1 * | 3/2015 | Clough | G08C 17/02 5/83.1 |

FOREIGN PATENT DOCUMENTS

WO     WO2011088053 A2     7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Leonard Saint Cyr
(74) *Attorney, Agent, or Firm* — Lee & Hayes, PLLC (57) ABSTRACT

A speech-based audio device may be configured to detect a user-uttered trigger expression and to respond by interpreting subsequent words or phrases as commands. In order to distinguish between utterance of the trigger expression by the user and generation of the trigger expression by the device itself, output signals used as speaker inputs are analyzed to detect whether the trigger expression has been generated by the speaker. If a detected trigger expression has been generated by the speaker, it is disqualified. Disqualified trigger expressions are not acted upon the by the audio device.

21 Claims, 4 Drawing Sheets

QUALIFYING TRIGGER EXPRESSIONS IN SPEECH-BASED SYSTEMS

BACKGROUND

Homes, offices, automobiles, and public spaces are becoming more wired and connected with the proliferation of computing devices such as notebook computers, tablets, entertainment systems, and portable communication devices. As computing devices evolve, the ways in which users interact with these devices continue to evolve. For example, people can interact with computing devices through mechanical devices (e.g., keyboards, mice, etc.), electrical devices (e.g., touch screens, touch pads, etc.), and optical devices (e.g., motion detectors, camera, etc.). Another way to interact with computing devices is through audio devices that capture and respond to human speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure pertains generally to a speech interface device or other audio device that provides or facilitates speech-based interactions with a user. The audio device has a speaker that produces audio within the environment of a user and a microphone that captures user speech. The audio device may be configured to respond to user speech by performing functions and providing services. Spoken user commands may be prefaced by a keyword, also referred to as a trigger expression or wake expression. In response to detecting the trigger expression, the audio device interprets any immediately following words or phrases as actionable input or commands.

In described embodiments, a keyword spotter or speech recognition component is used to detect occurrences of the trigger expression in a microphone signal. The microphone signal contains user-generated audio including speech, but may also contain audio generated by the speaker of the audio device. The speaker-generated audio may at times contain the trigger expression, which may be picked up by the microphone and which may cause the audio device to react as if the user has spoken the trigger expression.

The output audio is generated from one or more output audio signals, which may represent music, speech, or other types of audio. Keyword spotters monitor the output audio signals and detect occurrences of the trigger expression in the output audio signals. When an occurrence of the trigger expression is detected in one of the output audio signals, any coinciding occurrence of the trigger expression in the input audio signal is ignored or disqualified. The audio device is configured to recognize and interpret speech that follows a qualified trigger expression, but to ignore or take no action with respect to speech that follows a disqualified trigger expression.

Keyword spotters associated with individual output audio signals or streams may also be used for other purposes. For example, keyword spotters may be configured to detect occurrences of disallowed expressions (such as profanity) in output audio, allowing the audio device to delete or omit playback of the disallowed expressions from the device's speaker.

The keyword spotters may also be configured to detect other words or expressions in the output audio signals or streams, and various actions may be performed in response to detecting such expressions words or expressions.

In some cases, detection of trigger expressions or other expressions may be performed at a server, prior to providing an output audio signal to the audio device over a network connection. Signals or notifications may be provided by the server along with the output audio signal, indicating the points within the output audio signal at which the expressions occur. The audio device may use such signals or notifications to disqualify trigger expressions that are detected in the microphone signal at the points indicated by the signals or notifications.

Figure 1:
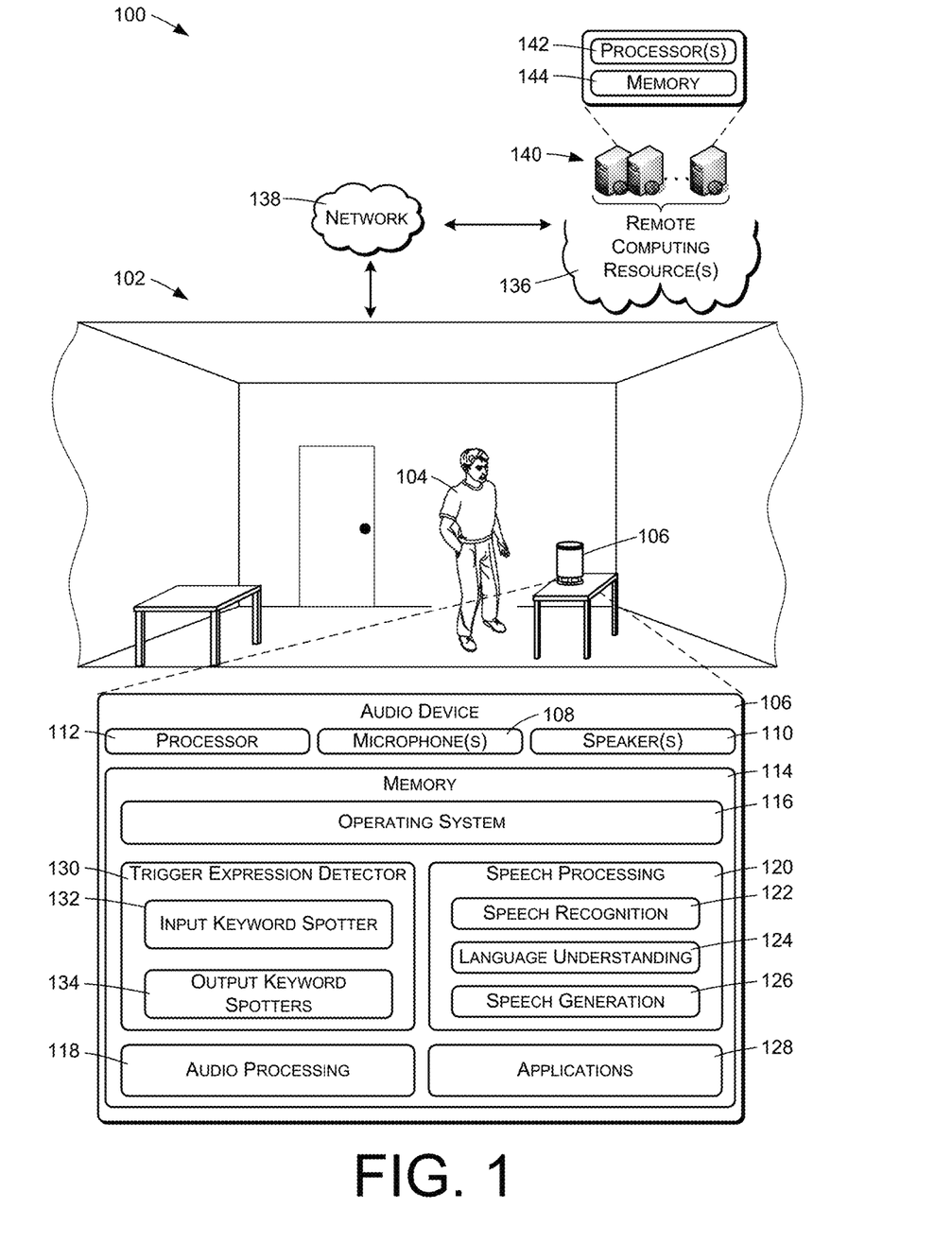
FIG. 1 is a block diagram of an illustrative voice interaction computing architecture that includes a voice-controlled audio device.

FIG. 1 shows an example of a voice interaction computing architecture 100 set in an environment 102, such as a home environment that includes a user 104. The architecture 100 includes an electronic, voice-controlled audio device 106 with which the user 104 may interact. In the illustrated implementation, the audio device 106 is positioned on a table within a room of the environment 102. In other implementations, the audio device 106 may be placed in any number of locations (e.g., ceiling, wall, in a lamp, beneath a table, under a chair, etc.). Furthermore, more than one audio device 106 may be positioned in a single room, or one audio device 106 may be used to accommodate user interactions from more than one room.

Generally, the audio device 106 may have one or more microphones 108 and one or more audio speakers or transducers 110 to facilitate audio interactions with the user 104 and/or other users. The microphone 108 produces a microphone signal, also referred to as an input audio signal, representing audio from the environment 102 such as sounds uttered by the user 104 and ambient noise within the environment 102. The input audio signal may also contain output audio that has been produced by the speaker 110.

In some cases, the microphone 108 may comprise a microphone array that is used in conjunction with audio beamforming techniques to produce an input audio signal that is focused in a selectable direction. Similarly, a plurality of directional microphones 108 may be used to produce an audio signal corresponding to one of multiple available directions.

The audio device 106 includes operational logic, which in many cases may comprise a processor 112 and memory 114. The processor 112 may include multiple processors and/or a processor having multiple cores. The memory 114 may contain applications and programs in the form of instructions that are executed by the processor 112 to perform acts or actions that implement desired functionality of the audio device 106, including the functionality specifically described below. The memory 114 may be a type of computer storage media and may include volatile and nonvolatile memory. Thus, the memory 114 may include, but is not limited to, RAM, ROM, EEPROM, flash memory, or other memory technology.

The audio device 106 may have an operating system 116 that is configured to manage hardware and services within and coupled to the audio device 106.

The audio device 106 may include audio processing components 118 for processing input audio signals generated by the microphone 108 and/or output audio signals provided to the speaker 110. As an example, the audio processing components 118 may implement acoustic echo cancellation to reduce audio echo generated by acoustic coupling between the microphone 108 and the speaker 110. The audio processing components 118 may also implement noise reduction to reduce noise in received audio signals, such as elements of input audio signals other than user speech. In certain embodiments, the audio processing components 118 may include one or more audio beamformers that are responsive to multiple microphones 108 to generate an audio signal that is focused in a direction from which user speech has been detected.

The audio device 106 may include speech processing components 120. The speech processing components 120 receive an input or microphone audio signal that has been processed by the audio processing components 118 and perform various types of processing in order to understand the intent expressed by human speech. The speech processing components 120 may include an automatic speech recognition (ASR) component 122 that recognizes human speech in the audio represented by the received audio signal. The speech processing components 120 may also include a natural language understanding component 124 that is configured to determine user intent based on recognized speech of the user 104.

The speech processing components 120 may also include a text-to-speech or speech generation component 126 that converts text to audio for generation at the speaker 110.

The audio device 106 may include a plurality of applications 128 that are configured to work in conjunction with other elements of the audio device 106 to provide services and functionality. The applications 128 may include media playback services such as music players. Other services or operations performed or provided by the applications 128 may include, as examples, requesting and consuming entertainment (e.g., gaming, finding and playing music, movies or other content, etc.), personal management (e.g., calendaring, note taking, etc.), online shopping, financial transactions, database inquiries, person-to-person voice communications, and so forth.

In some embodiments, the applications 128 may be preinstalled on the audio device 106, and may implement core functionality of the audio device 106. In other embodiments, one or more of the applications 128 may be installed by the user 104 or otherwise installed after the audio device 106 has been initialized by the user 104, and may implement additional or customized functionality as desired by the user 104.

In certain embodiments, the primary mode of user interaction with the audio device 106 may be through speech. For example, the audio device 106 may receive spoken commands from the user 104 and provide services in response to the commands. The user may speak a predefined wake or trigger expression (e.g., "Awake"), which may be followed by instructions or directives (e.g., "I'd like to go to a movie. Please tell me what's playing at the local cinema."). Provided services may include performing actions or activities, rendering media, obtaining and/or providing information, providing information via generated or synthesized speech via the audio device 106, initiating Internet-based services on behalf of the user 104, and so forth.

The audio device 106 may include a trigger expression detector 130 that monitors received input audio from the microphone 108 and provides event notifications to the speech processing components 120 and/or applications 128 in response to user utterances of a trigger expression keyword. The speech processing components 120 and/or applications 128 may respond by interpreting and acting upon user speech that immediately follows the trigger expression. The trigger expression may comprise a word, a phrase, or other sound.

The trigger expression detector 130 may be implemented by an input keyword spotter 132 and one or more output keyword spotters 134. A keyword spotter is a functional component or algorithm that evaluates an audio signal to detect the presence of one or more predefined words or expressions in the audio signal. Keyword spotters may be referred to herein as word or expression detectors. In the example of FIG. 1, the input keyword spotter 132 is configured to detect the presence of the trigger expression in the microphone signal, and the output keyword spotters 134 are configured to detect the presence of the trigger expression in output audio signals, such as audio signals that are directed to and rendered by the speaker 110. As will be described in more detail below, the information provided by the output keyword spotters 134 is used to qualify or disqualify trigger expressions that are detected by the input keyword spotter 132.

In some cases, one or more of the keyword spotters 132 and 134 may be implemented using automated speech recognition (ASR) techniques. For example, large vocabulary speech recognition techniques may be used for keyword detection, and the output of the speech recognition may be monitored for occurrences of the keyword. As an example, the keyword spotters described herein may use hidden Markov models and Gaussian mixture models to recognize voice input and to provide a continuous word stream corresponding to the voice input. The word stream may then be monitored to detect the trigger expression.

In other cases, more general ASR techniques may be simplified to detect a specific word or a limited number of words rather than attempting to recognize a large vocabulary. In these cases, a keyword spotter may provide a notification when one of the words is detected in a voice signal, rather than providing a textual or word-based output. A keyword spotter using these techniques may compare different words based on hidden Markov models (HMMs), which represent words as series of states. Generally, an utterance is analyzed by comparing its model to a keyword model and to a background model. Comparing the model of the utterance with the keyword model yields a score that represents the likelihood that the utterance corresponds to the keyword. Comparing the model of the utterance with the background model yields a score that represents the likelihood that the utterance corresponds to a generic word other than the keyword. The two scores can be compared to determine whether the keyword was uttered.

In some instances, the audio device 106 may operate in conjunction with or may otherwise utilize computing resources 136 that are remote from the environment 102. The audio device 106 may couple to the remote computing resources 136 over a network 138. As illustrated, the remote computing resources 136 may be implemented as one or more servers or server devices 140. The remote computing resources 136 may in some instances be part of a network-accessible computing platform that is maintained and accessible via a network 138 such as the Internet. Common expressions associated with these remote computing resources 136 may include "on-demand computing", "software as a service (SaaS)", "platform computing", "network-accessible platform", "cloud services", "data centers", and so forth.

Each of the servers 140 may include processor(s) 142 and memory 144. The servers 140 may perform various functions in support of the audio device 106, and may also provide additional services in conjunction with the audio device 106. Furthermore, one or more of the functions described herein as being performed by the audio device 106 may be performed instead by the servers 140, either in whole or in part. As an example, the servers 140 may in some cases provide the functionality attributed above to the speech processing components 120 and all or parts of the trigger expression detector 130. Similarly, one or more of the applications 128 may reside in the memory 144 of the servers 140 and may be executed by the servers 140.

The audio device 106 may communicatively couple to the network 138 via wired technologies (e.g., wires, universal serial bus (USB), fiber optic cable, etc.), wireless technologies (e.g., radio frequencies (RF), cellular, mobile telephone networks, satellite, Bluetooth, etc.), or other connection technologies. The network 138 is representative of any type of communication network, including data and/or voice network, and may be implemented using wired infrastructure (e.g., coaxial cable, fiber optic cable, etc.), a wireless infrastructure (e.g., RF, cellular, microwave, satellite, Bluetooth®, etc.), and/or other connection technologies.

Although the audio device 106 is described herein as a voice-controlled or speech-based interface device, the techniques described herein may be implemented in conjunction with various different types of devices, such as telecommunications devices and components, hands-free devices, entertainment devices, media playback devices, and so forth.

Figure 2:
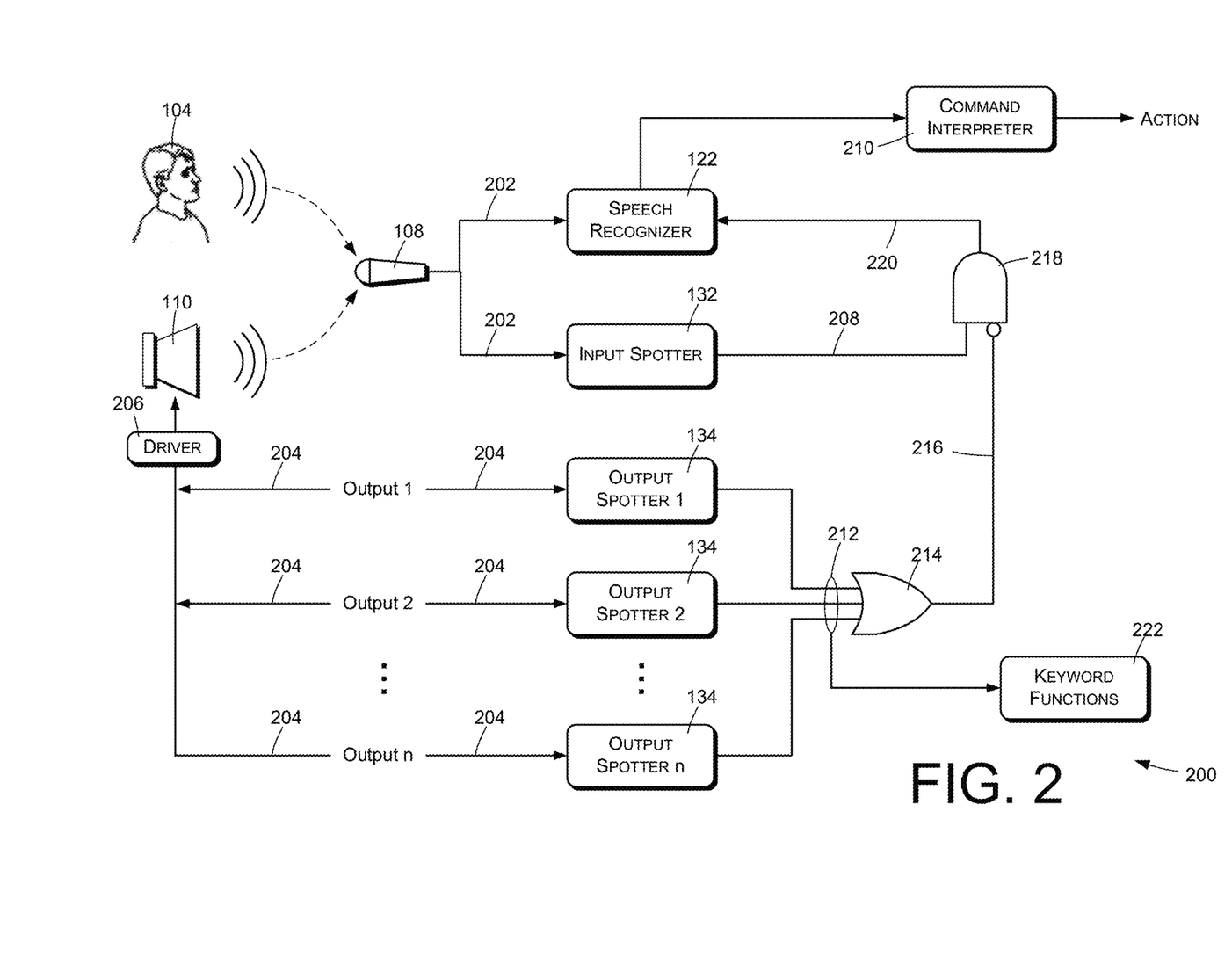
FIG. 2 is a block diagram illustrating functionality that may be implemented to discriminate between user-uttered trigger expressions and device-produced trigger expressions.

FIG. 2 illustrates further operational and functional examples regarding a speech-based user interface system 200. The system 200 may be implemented by a stand-alone device, such as the audio device 106 described above, and the functions, objects, and or components illustrated by FIG. 2 may be implemented entirely within the audio device 106. Alternatively, the system 200 may be implemented by a local device in combination with remote computing resources, and certain of the illustrated functions, objects, and or components may be implemented by the remote computing resources 136. Similarly, illustrated and/or discussed communications or signals between the functions, objects, and or components of FIG. 2 may take place within the audio device 106 or may take place between the audio device 106 and the remote computing resources 136. Audio signals shown and discussed herein may comprise analog signals, digital data streams, or other signals that convey audio related information.

The system 200 receives a microphone signal 202, also referred to herein as an input audio signal 202, from the microphone 108. The microphone signal 202 contains user speech and other utterances. The microphone signal 202 may also contain audio generated or produced by the speaker 110 of the audio device 106.

The system receives and/or provides one or more speaker signals 204, also referred to herein as output signals or output audio signals, to the speaker 110. The system 200 may include a speaker driver 206, which may provide conversion, amplification, buffering, filtering, mixing, and so forth to provide a signal of the appropriate electrical format for driving one or more speaker elements of the speaker 110.

The speaker signals 204 may correspond to respective audio sources. As an example, an audio source may comprise a local data object or store, which is read and converted to a speaker signal 204. As another example, an audio source may comprise a remote device or service, such as a network-based device or service, which provides an audio stream to the audio device 106. As another example, an audio source may comprise a media player application that reads a local data object or receives an audio signal from an external source such as another device or a network service and provides the speaker signal 204 within the audio device 106.

The speaker signals 204 may represent various types of audio, including, for example, radio; live, recorded, or machine-generated speech; person-to-person communications; command responses of speech-based user interface devices; and so forth. In some cases, a speaker signal may comprise text, such as sequences of words that are subsequently converted to audio speech by components of the speaker driver 206, which may be configured to include the speech generation component 126 of FIG. 1. Generally, the speaker signals may comprise text streams, words, utterances, sounds, digital audio streams, analog audio signals, or any other types of signals that may be used to convey information for rendering by the speaker 110.

The system 200 detects the trigger expression in the microphone signal and qualifies the detected trigger by determining whether it has been uttered by the user 104 or produced by the speaker 110. A trigger expression detected in the microphone signal 202 is said to be a qualified trigger expression if it has been uttered by the user 104 and/or not produced by the speaker 110.

In the embodiment illustrated by FIG. 2, a trigger expression detected in the microphone signal 202 is qualified as a function of whether the trigger expression is also detected in one or more of the speaker signals 204. If a trigger expression is detected in the microphone signal 202 but not in any of the speaker signals 204, the trigger expression is said to be valid or qualified. If the trigger expression is detected in the microphone signal 202 and one or more of the speaker signals 204, the trigger expression is said to be invalid or disqualified.

More specifically, the input keyword spotter 132 receives the microphone signal 202 and detects occurrences of a predefined wake or trigger expression in the microphone signal 202. The input keyword spotter 132 produces an input trigger signal 208. The input trigger signal 208 is asserted to be logically true when the predefined wake or trigger expression is detected in the microphone signal 202. The input trigger signal 208 is logically false when the predefined wake or trigger expression is not detected in the microphone signal 202.

The speech recognition component 122, referred to in FIG. 2 as a speech recognizer, is configured to receive the microphone signal 202 and to perform speech recognition with respect to the audio represented by the microphone signal 202 following a qualified trigger expression. Recognized speech is provided as a text stream to a command interpreter 210, which may utilize the natural language understanding component 124 of FIG. 1 as well as other resources, including one or more of the applications 128. The command interpreter 210 interprets the recognized speech and in response performs an action in accordance with the particular implementation of the audio device 106.

Note that in some embodiments the input spotter 132 and its functionality may be implemented by the speech recognizer 122.

The output keyword spotters 134 are configured respectively to receive the individual output signals 204 and to detect occurrences of the predefined wake or trigger expression in the output signals 204. The output keyword spotters 134 produce output trigger signals 212, each of which is asserted logically true when the predefined wake or trigger expression has been detected by the corresponding output keyword spotter 134 and logically false when the predefined wake or trigger expression is not detected by the corresponding output keyword spotter 134.

The output trigger signals 212 are received by an OR function 214. The OR function 214 produces an output 216 that is referred to herein as a qualifier signal 216. The qualifier signal 216 is logically true when any one or more of the output keyword spotters 134 produces a true output trigger signal 212, corresponding to the situation in which any one or more of the output signals 204 contains the trigger expression. The qualifier signal 216 is logically false when none of the output keyword spotters 134 produces a true output, corresponding to the situation in which none of the output signals 204 contains the trigger expression.

A trigger expression qualifier 218 receives the qualifier signal 216 and the input trigger signal 208. The expression qualifier 218 may be implemented logically as an AND function having a non-inverting input and an inverting input. The input trigger signal 208 is received at the non-inverting input of the trigger expression qualifier 218. The qualifier signal 216 is received by the inverting input of the trigger expression qualifier 218. The trigger expression qualifier 218 produces a logically true output when the input trigger signal 208 is true and the qualifier signal 216 is false, corresponding to the situation in which the trigger expression has been detected in the microphone signal 202 but has not been detected in any of the output signals 204. The trigger expression qualifier 218 produces a logical false output when qualifier signal 216 is true, corresponding to any situation in which the trigger expression has been detected in any one or more of the output signals 204.

The output of the trigger expression qualifier 218 is referred to herein as a qualified trigger signal 220. The speech recognizer 122 receives and is responsive to the qualified trigger signal 220 to recognize any speech that is received from the microphone 108 immediately following a qualified occurrence of the trigger expression, as indicated by the qualified trigger signal 220. In other words, the qualified trigger signal 220 signals the speech recognizer to begin receiving and recognizing speech, which is then provided to the command interpreter 210 for appropriate response.

In certain implementations, additional logic may be employed to account for timing variations and relative delays between the various signals. For example, the input keyword spotter 132, the output keyword spotters 134, the speech recognition components 122, and the command interpreter 210 may all impose inherent and potentially different delays with respect to individual signals, and such delays may be accounted for when implementing the logic shown by FIG. 2.

In some embodiments, the output keyword spotters 134 may be configured to detect keywords other than the trigger expression. The output trigger signals 212 of the output keyword spotters 134 may indicate detection of such additional keywords, and may be provided to a functional component 222 that is configured to implement desired functions upon the detection of the additional keywords in one or more of the output signals 204. As an example, the output keyword spotters 134 may be configured to detect certain disallowed words such as profanity, and to mute the speaker 110 when such words are detected in the output signals 204 to prevent playback of those words by the speaker 110. As another example, the output keyword spotters 134 may be configured to detect certain watchwords, and to provide a notification (such as a text message or other alert) to a user whenever such watchwords are detected in one or more of the output signals 204.

Although the output signals 204 in many cases may comprise audio signals such as digital data streams or analog signals, in some cases one or more of the output signals 204 may comprise text or words, and the driver 206 may include text-to-speech functionality for converting the text or words to an audio signal. Words may be in the form of individual words, word streams, strings of words, word indexes, words with metadata, words with associated timestamps, and so forth. In some situations, the words may include information (e.g., timestamps, sequencing numbers, etc.) that specify where the words appear in a string or stream or words, such as those in an audio output signal. In this case, the corresponding output keyword spotter 134 may comprise a text-based detector or spotter that monitors the text or word stream for occurrences of trigger expressions, disallowed expressions, watch words, or other expressions.

More generally, each of the output keyword spotters may be tailored to the particular type of output signal to which it is applied. It may be the case, for example, that one of the output keyword spotters is applied to a music stream, and the output keyword spotter may be optimized to detect words, phrases, or other utterances in music. Another of the output keyword spotters may be applied to a podcast or other spoken media, and may be optimized for the spoken word.

Figure 3:
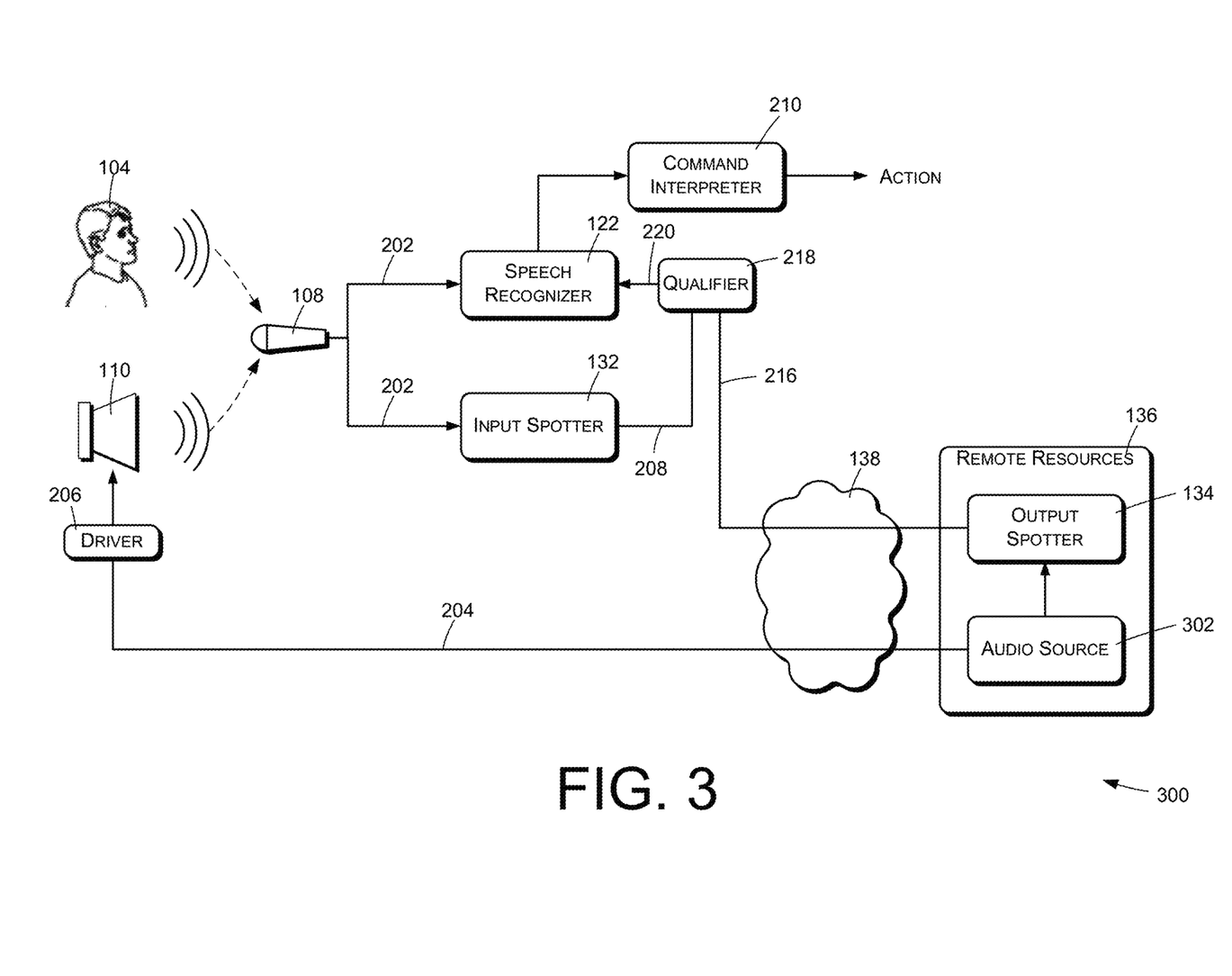
FIG. 3 is a block diagram illustrating further functionality that may be implemented to discriminate between user-uttered trigger expressions and device-produced trigger expressions.

FIG. 3 illustrates an example system 300 in which an output signal 204 is provided by or from a service such as may be implemented by the remote computing resources 136. In many respects, the system 300 is the same as the system 200 of FIG. 2. In this example, however, an output signal 204 is generated by the remote computing services 136 from an audio source 302, which may be part of the remote computing services 136 or may be accessed by the remote computing resources 136. The output signal 204 is provided through the network 138 is used by the audio device 106 to drive the speaker 110.

In this example, the input keyword spotter 132, the speech recognition component 122, the command interpreter 210, and the expression qualifier 218 are all implemented by the audio device 106. The output keyword spotter 134, however, is implemented by or at the remote computing resources 136. The output keyword spotter 134 receives the output signal 204 and generates the qualification signal 216 in response to detection of the trigger expression. The signal is communicated through the network 138 and received by the expression qualifier 218, which may be implemented logically to disqualify trigger expressions detected in the input signal 202 when the trigger expression is also present in the output signal 204.

In this embodiment, the qualification signal 216 may comprise a flag, notification, or message that is sent to the audio device 106 and that indicates locations in the output signal 204 at which the trigger expression occurs. The expression qualifier 218 may be a logical component or function that evaluates the flag, notification, or message and to qualify or disqualify the input trigger signal 208 based on whether a trigger expression in the microphone signal 202 corresponds in location to the known position of a trigger expression in the output signal 204.

Although FIG. 3 shows only a single output signal 204, multiple output signals 204 may be received by the audio device 106 and rendered by the speaker 110. One or more of the audio signals may come from remote sources such as the remote computing resources 136, and one or more of the audio signals may be generated locally, within or by the audio device 106.

Figure 4:
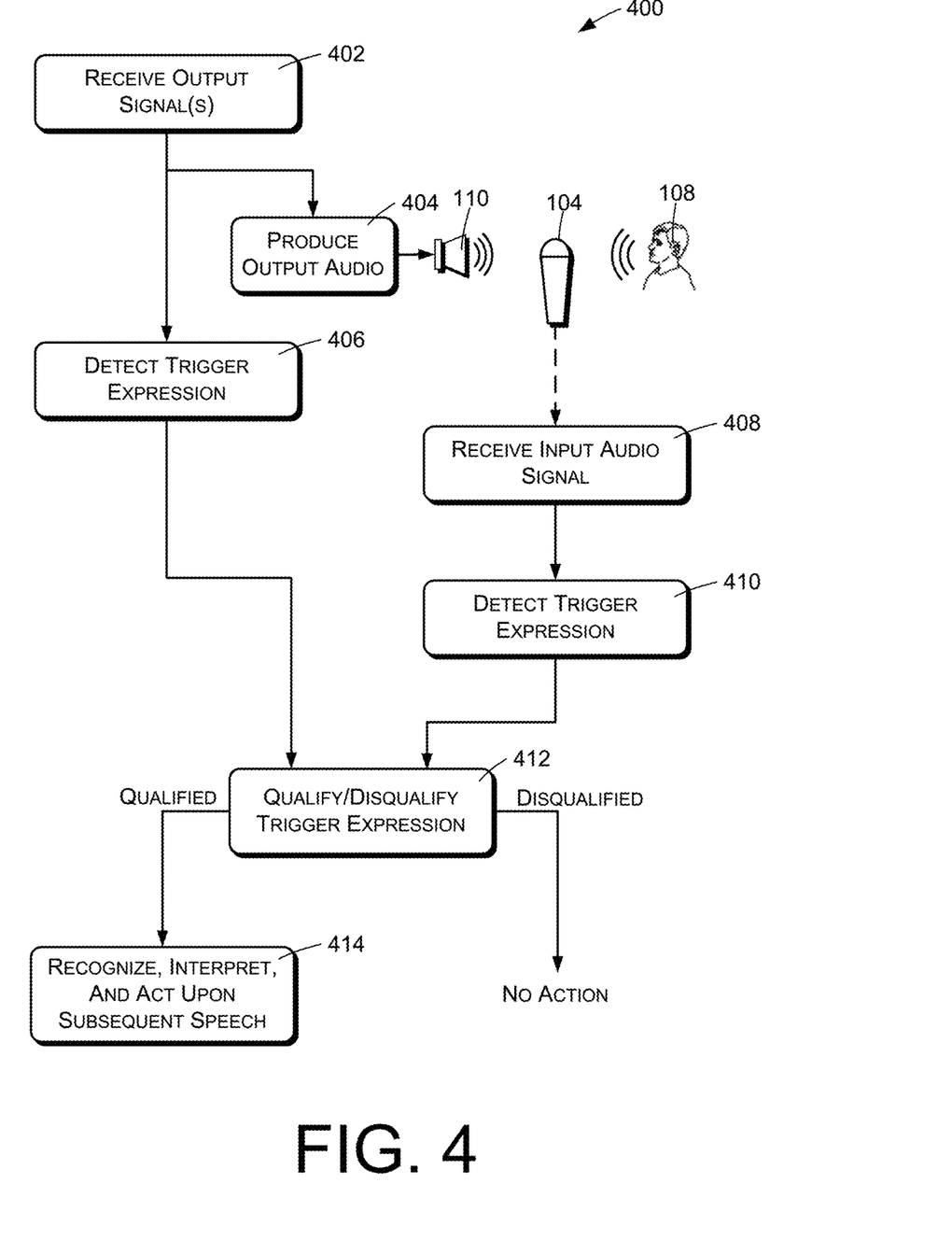
FIG. 4 is a flow diagram illustrating an example process for discriminating between user-uttered trigger expressions and device-produced trigger expressions.

FIG. 4 illustrates an example method 400 of detecting and qualifying trigger expressions, such as might be performed in conjunction with the architectures and configurations described above. Although the example method 400 is described with reference to the preceding figures, the method may also be performed in other environments and in conjunction with other devices and systems.

An action 402 comprises receiving the one or more output signals 204. The output signals 204 may be generated within or by the device 106, or may be produced and provided by external sources, including network-based sources. The output signals 204 may comprise analog signals, digital data streams, or other types of signals, including text or word streams. The output signals 204 may represent music, speech, and/or other types of audio.

An action 404 comprises producing output audio at the device speaker 110 based on one or more of the output signals 204. Producing the output audio may include various operations, including converting, amplifying, filtering, and so forth, and may include text-to-speech conversion.

An action 406 comprises analyzing the one or more output signals 204 to detect occurrences of the trigger expression in the output signals 204. This may be performed using keyword spotting techniques and/or other automatic speech recognition techniques. In some cases, analyzing the one or more output signals 204 may comprise monitoring words or text within the output signals 204 to detect textual occurrences of the trigger expression.

An action 408 comprises receiving the microphone audio signal 202 from the microphone 108. The microphone audio signal 202 may contain user speech and may also contain portions or components of the output audio generated by the speaker 110.

An action 410 comprises analyzing the input signal 202 to detect occurrences of the trigger expression in the microphone audio signal 202. This may be performed using keyword spotting techniques and/or other automatic speech recognition techniques.

An action 412 comprises qualifying or disqualifying trigger expressions that are detected in the microphone audio signal 202, in response to the qualifier signal 216 generated in the action 402. More specifically, the action 412 comprises qualifying trigger expressions detected in the input signal 202 by the input keyword spotter 132 if the trigger expression is not detected in one or more of the output signals 204 by the one or more output keyword spotters 134, and disqualifying trigger expressions detected in the microphone audio signal 202 by the input keyword spotter 132 if the trigger expression is detected in one or more of the output signals 204 by the one or more output keyword spotters 134.

An action 414 is performed only in response to occurrences of qualified trigger expressions. The action 412 comprises recognizing, interpreting, and/or acting upon speech that follows a qualified trigger expression in the microphone audio signal 202. This may include performing speech recognition and natural language understanding. In addition, the action 412 may comprise performing an action or function in response to recognized speech or commands that follow a qualified occurrence of the trigger expression. Thus, speech following a detected occurrence of the trigger expression in the microphone audio signal is recognized an acted upon unless the trigger expression is also detected in one or more of the trigger expression in one or more of the output signals 204.

The embodiments described above may be implemented programmatically, such as with computers, processors, digital signal processors, analog processors, and so forth. In other embodiments, however, one or more of the components, functions, or elements may be implemented using specialized or dedicated circuits, including analog circuits and/or digital logic circuits. The term "component", as used herein, is intended to include any hardware, software, logic, or combinations of the foregoing that are used to implement the functionality attributed to the component.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A speech-based system, comprising:
a speaker configured to generate output audio from at least one output signal;
a microphone configured to produce an input signal representing user speech and at least a portion of the output audio;
an input detector configured to detect a trigger expression in the input signal;
at least one output detector configured to detect the trigger expression in the at least one output signal;
a trigger expression qualifier configured to qualify the trigger expression detected by the input detector based, at least in part, on the at least one output detector not detecting the trigger expression in the at least one output signal;
a speech recognizer configured to recognize speech represented by the input signal, the speech recognizer being responsive to the trigger expression; and
a command interpreter configured to receive the input signal that represents the speech, and to interpret commands from recognized speech that follows the trigger expression.

2. The speech-based system of claim 1, wherein the at least one output detector comprises a keyword spotter.

3. The speech-based system of claim 1, wherein the speech recognizer is configured to transmit at least a portion of the input signal to a remote resource to recognize the speech.

4. The speech-based system of claim 1, wherein an output signal of the at least one output signal comprises a digital audio stream.

5. The speech-based system of claim 1, wherein an output signal of the at least one output signal represents one or more words, and wherein one or more of the at least one output detector is configured to detect the trigger expression in the one or more words.

6. The speech-based system of claim 1, wherein one or more of the at least output detector or the input detector detects one or more additional keywords, and the system further comprising a component configured to implement at least one additional function based, at least in part, on detection of the one or more additional keywords.

7. The speech-based system of claim 1, wherein the trigger expression qualifier is further configured to disqualify the trigger expression detected by the input detector based, at least in part, on the at least one output detector detecting the trigger expression in the at least one output signal.

8. A method, comprising:
receiving an output signal;
receiving a qualifier signal indicating an occurrence of a trigger expression in the output signal;
producing output audio at a speaker based, at least in part, on the output signal;
receiving an input audio signal from a microphone, wherein the input audio signal represents user speech and at least a portion of the output audio;
analyzing the input audio signal to detect an occurrence of the trigger expression in the input audio signal; and
refraining from performing an action in response to speech that follows the occurrence of the trigger expression as represented by the input audio signal based, at least in part, on the qualifier signal indicating the occurrence of the trigger expression in the output signal.

9. The method of claim 8, wherein:
receiving the output signal comprises receiving the output signal from a network-based source; and
receiving the qualifier signal comprises receiving the qualifier signal from the network-based source.

10. The method of claim 8, further comprising analyzing the output signal to generate the qualifier signal.

11. The method of claim 8, further comprising analyzing the output signal with a keyword spotter to generate the qualifier signal.

12. The method of claim 8, wherein receiving the output signal comprises receiving a digital audio stream.

13. The method of claim 8, wherein the output signal represents content comprising one or more of the following:
music;
radio;
live, recorded, or machine-generated speech;
person-to-person communications;
command responses; or
text.

14. The method of claim 8, further comprising determining to disqualify the occurrence of the trigger expression in the input audio signal based, at least in part, on the qualifier signal indicating the occurrence of the trigger expression in the output signal.

15. One or more non-transitory computer-readable media storing computer-executable instructions that, when executed, cause one or more processors to perform acts comprising:
producing output audio based, at least in part, on an output signal;
analyzing an input audio signal to detect an occurrence of a trigger expression in the input audio signal;
analyzing the output signal to detect an occurrence of the trigger expression in the output signal; and
determining to disqualify the occurrence of the trigger expression in the input audio signal based, at least in part, on the occurrence of the trigger expression in the output signal.

16. The one or more computer-readable media of claim 15, the acts further comprising receiving the output signal from a network-based service.

17. The one or more computer-readable media of claim 15, wherein the output signal comprises a digital audio stream.

18. The one or more computer-readable media of claim 15, wherein the output signal represents one or more words.

19. The one or more computer-readable media of claim 15, wherein the output signal represents content comprising one or more of the following:
music;
radio;
live, recorded, or machine-generated speech;
person-to-person communications;
command responses; or
text.

20. The one or more computer-readable media of claim 15, the acts further comprising:
analyzing the output signal to detect an occurrence of a disallowed expression in the output signal; and
muting the output audio in response to detecting the occurrence of the disallowed expression in the output signal.

21. The one or more computer-readable media of claim 15, the acts further comprising:
analyzing the output signal to detect an occurrence of a predefined expression in the output signal; and
outputting audio that indicates the occurrence of the predefined expression in the output signal.

* * * * *